Aug. 8, 1933.　　　W. B. McGORUM　　　1,921,833
DECELEROMETER
Filed Feb. 26, 1931　　　2 Sheets-Sheet 1
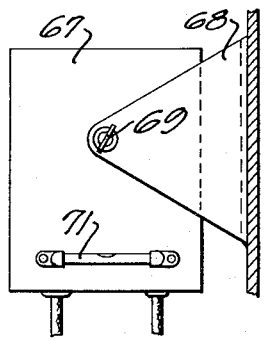
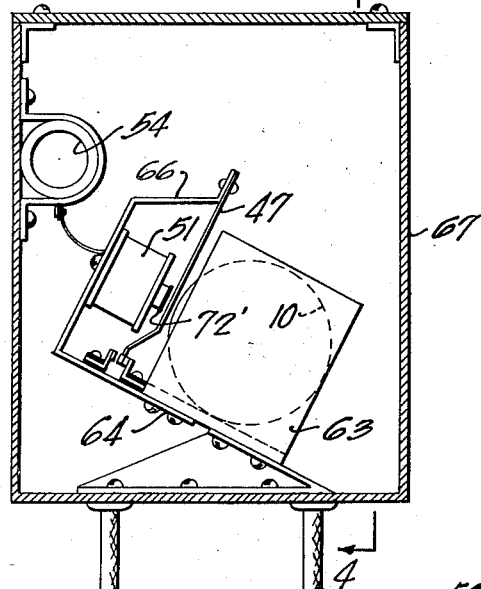
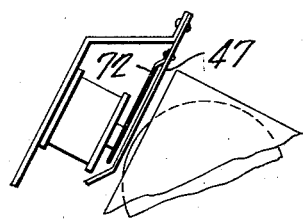
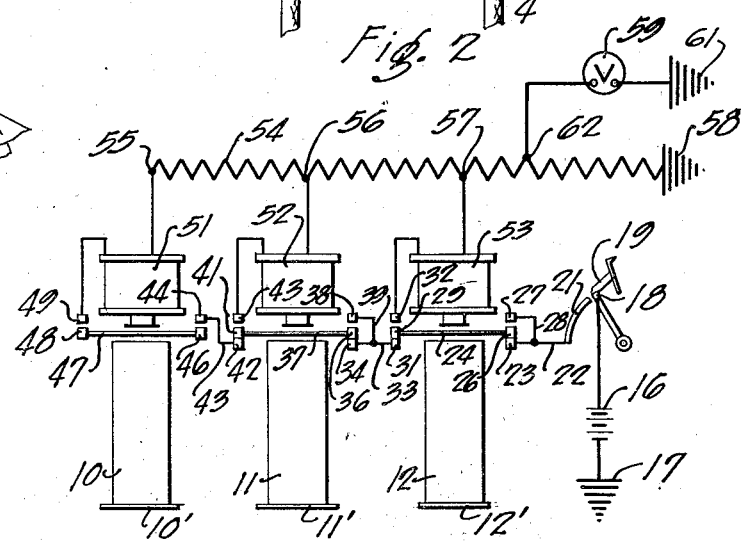
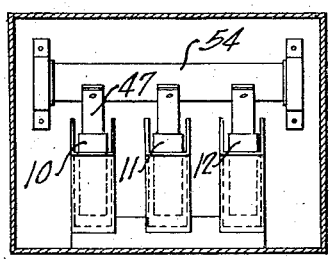
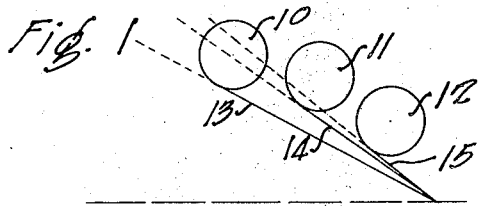
INVENTOR
WILLIAM B. McGORUM
by *Prindle, Bean, Cushman & Lackney*
ATT'YS

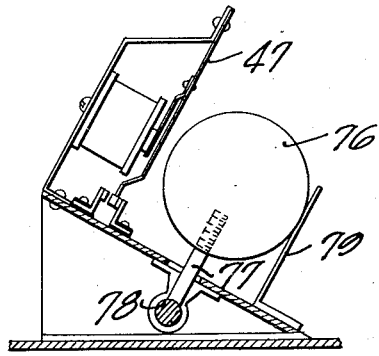
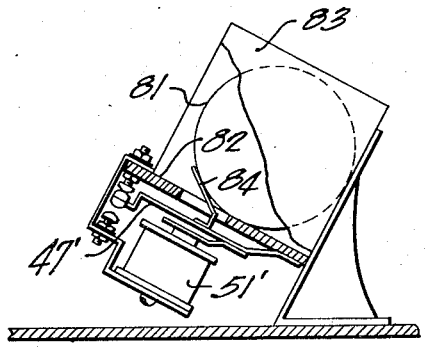
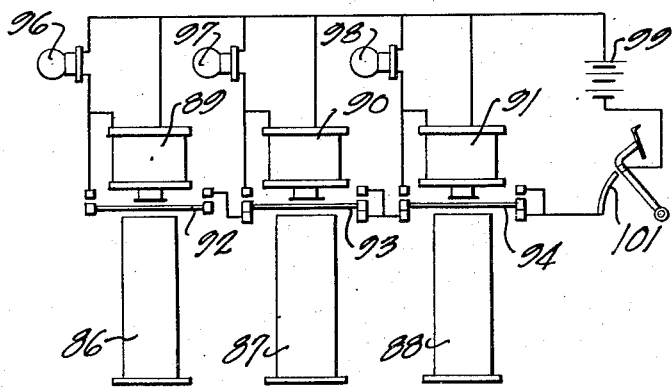
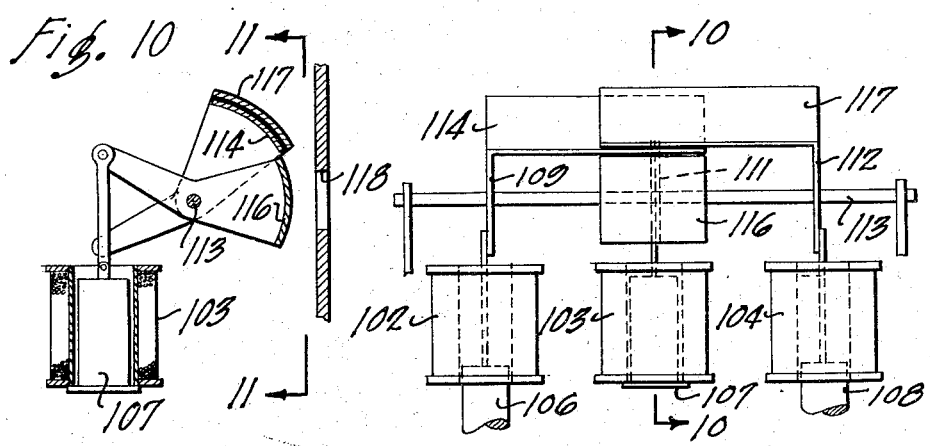

Patented Aug. 8, 1933

1,921,833

UNITED STATES PATENT OFFICE 1,921,833

DECELEROMETER

William B. McGorum, Norfolk, Va.

Application February 26, 1931. Serial No. 518,478

4 Claims. (Cl. 177—311.5)

This invention relates to the art of indicating acceleration or deceleration of a traveling body, as of an automobile, for example, and is directed particularly to means for indicating deceleration produced by applying the brakes. It frequently becomes desirable to ascertain whether automobile or other brakes are in a safe or unsafe condition. For these purpose the precise value of the operating efficiency or of the decelerating force applied is useful only in so far as it indicates one of these relative conditions. To facilitate this class of work it is highly desirable that apparatus employed be capable of indicating definitely any one of only a comparatively few relative conditions, such as poor, good or excellent. Furthermore, as soon as one of these predetermined conditions prevails the indication should be given instantaneously and this indication should remain until another of the selected conditions prevails, at which time the indicating means should change abruptly to indicate the new condition as distinguished from a progressive change from an indication of one condition to another. Moreover it is likewise desirable that a device of this kind be capable of holding the final indication until after the vehicle being tested has come to rest. This mode of operation provides all the desired information promptly and relieves the person doing the work from the task of ascertaining by mental reflection or otherwise the particular classification in which a specific reading belongs. It is also advantageous to have apparatus of this kind which is automatically restored to its initial condition as this facilitates making successive tests.

Objects of the present invention are to improve the art of indicating acceleration or deceleration by providing apparatus embodying the aforementioned desirable features; to provide apparatus for these purposes which is sensitive, accurate and reliable under the various conditions of operation; to provide a compact unit consisting of few moving parts which preferably are automatically restored to operative positions and which, while normally free to function, are ineffective except during an application of the brakes; to provide apparatus of this character consisting of a comparatively few relatively simple parts which are inexpensive to manufacture and maintain; to produce a device of the class described of rugged, durable construction well adapted for long and dependable service with freedom from repairs; and also to provide apparatus of this general class having an improved construction and relative arrangement of parts.

In the drawings:

Fig. 1 is a diagrammatic view illustrating the application of certain features of the invention;

Fig. 2 is a diagrammatic view of the apparatus embodying the features of the invention;

Fig. 3 is a transverse vertical section through a decelerometer of the type illustrated in Fig. 2;

Fig. 4 is a section to a reduced scale along the line 4—4 of Fig. 3;

Fig. 5 is an end elevation illustrating a mounting for the apparatus;

Fig. 6 is a detail view illustrating a modified form of construction of the apparatus shown in Fig. 3;

Figs. 7 and 8 are side elevations with parts broken away showing further modified forms of actuating units;

Fig. 9 is a diagrammatic view similar to Fig. 2 but illustrating a modification;

Fig. 10 is a transverse section along the line 10—10 of Fig. 11 showing a further modified form of apparatus; and Fig. 11 is a section along the line 11—11 of Fig. 10.

In Fig. 1 of the drawings, bodies 10, 11 and 12 represent inertia members having surfaces of revolution, preferably being spherical or cylindrical. These bodies are disposed respectively upon inclined planes 13, 14 and 15, each of these planes being inclined at a different angle to horizontal so that in each case a different force is required to balance the cylindrical or spherical body on its plane. By selecting bodies 10, 11 and 12 of proper dimensions and weights and arranging the inclined planes associated therewith at proper angles the force required to move each of these bodies upwardly along the inclined surfaces upon which they are disposed may be made to correspond substantially to that produced by deceleration of a vehicle. According to the present invention cylindrical or spherical bodies of this type are arranged upon inclined planes, the parts being so constructed and arranged that on an application of brakes which are in poor condition the resulting deceleration will produce a reaction or force sufficient only to cause one of the bodies, as the body 10 to move upwardly on its plane 13, the other bodies being unaffected by a force of this magnitude and therefore remain at rest on their respective planes. As the condition of the brakes improves the reactions tending to move these bodies or inertia members increase in magnitude so that when in good condition the brakes may produce a reaction or force sufficient to move the body 11 as well as the body 10, and if the parts are properly selected and arranged as will be understood the body 12 will remain at rest until for example the brakes are in excellent condition.

The application of these features in accordance with this invention is illustrated in further detail in Figs. 2, 3 and 4, the inertia members being illustrated in the top plan view in Fig. 2 as cylindrical bodies 10, 11 and 12 resting upon their inclined planes and supported against stops 10', 11' and 12'. A source of electrical energy, as a battery 16 has one of its terminals grounded at 17 and its other terminal connected to a contact 18 carried by the brake operating lever 19 and arranged upon an arm of this lever to engage a segment 21 and thus complete the circuit from battery 16 through a conductor 22 to a contact 23 whenever the brake lever is depressed to apply the brakes. A movable bridge piece 24 carries a contact 26 which is engageable with the contact 23 and also with a contact 27 connected by a wire 28 to the conductor 22. The other end of the bridge piece is provided with a contact 29 which is engageable with contacts 31 and 32 disposed on opposite sides thereof. A conductor 33 extends from the contact 31 to a contact 34 which is engageable with the end contact 36 of a bridge piece 37, the latter contact being also engageable with a contact 38 connected by a wire 39 to the wire 33. This bridge piece carries at its other end a contact 41 which is engageable with contacts 42 and 43 disposed on opposite sides thereof, the contact 42 being connected by a conductor 43 with a contact 44 disposed on the upper side of a contact 46 carried by one end of a bridge piece 47. This bridge piece also carries at its other end a contact 48 which is engageable with a superposed contact 49. Electromagnets 51, 52 and 53 are disposed directly opposite the bodies 10, 11 and 12 respectively with the bridge piece 47, 37 and 24 interposed between each magnet and its associated cylindrical body. The contact 49 is connected to the winding of the magnet 51, the latter having its other terminal connected to a resistance 54 at a point 55. In a like manner a contact 43 is connected to one terminal of the winding of magnet 52 and the other terminal of this magnet is connected at a point 56 to the resistance, the contact 32 being similarly connected to magnet 53 which is connected to the resistance at a point 57, the resistance being grounded at 58 and having a volt meter 59 grounded at 61 and connected to the resistance at a point 62.

An important advantage of this invention resides in that construction and relative arrangement of parts whereby each of the rolling bodies 10, 11 and 12 is of comparatively large diameter and has a radius greater than the distance of travel of such body on its plane as determined by the spacing of the respective supporting means 10', 11' and 12' and the associated bridge pieces 47, 37 and 24 (Figs. 1 and 2). Thus inaccuracies due to sliding or skidding of the bodies are avoided, as well as the impacts from such sliding and the like. In this way it is assured that each body will ascend its plane with a smooth rolling action precisely when the predetermined reaction occurs and damage due to shocks, impacts and the like, are thereby avoided. This provides a very reliable and durable construction. These features are also embodied in other illustrated embodiments, as will be evident.

In the operation of this form of the apparatus it will be seen that while the brake operating lever 19 is depressed to apply the brakes the circuit is made from the battery 16 through the contact 18 and the segment 21 and across the bridge pieces 24 and 37 but that this circuit is open at the contacts 44 and 46 and 48 and 49. As the car decelerates due to the application of the brakes, a reaction is produced which causes the cylindrical body 10 to move upwardly along its inclined plane and in so doing to force the bridge piece 47 across the contacts 44 and 49 thus completing an electrical circuit through the magnet 51 and the resistance 54 and producing a definite reading on the volt meter 59. This reading may be taken to indicate that if the brakes have been fully applied they are in poor condition. However, on further application of the brakes the cylinder 11 is caused to advance upwardly along its inclined plane and to move the bridge piece 37 across the contacts 38 and 43. It will be seen that this movement of the bridge piece 37 breaks the circuit through the magnet 51 at the contacts 34 and 42 and that the volt meter will now indicate a greater value as the portion of the circuit including the resistance between the points 55 and 56 has been cut out. This reading of the volt meter may then be taken as an indication that the brakes are in good condition. It will be apparent that if on further application of the brakes the body 12 is caused to ascend its inclined plane the circuit to the magnet 52 will be broken as the bridge piece 24 is moving across the contacts 27 and 32 to complete the circuit of the magnet 53. This cuts out that portion of the circuit including the resistance between the points 56 and 57 and produces a definite change in the reading of the volt meter so as to give an indication on this instrument which may show that the brakes are in excellent working order. It will be seen in each case that as the bridge piece moves to close the upper set of contacts the magnet associated with the bridge piece functions as a holding relay to maintain the bridge piece across these upper contacts and thus to retain the reading of the volt meter until the circuit is broken at the segment 21 and contact 18 by releasing the brakes.

Apparatus of this character is shown in Figs. 3 and 4 in which the movable body 10 is enclosed in a casing 63 upon an inclined support 64 and arranged to function in the manner just described with the rear wall of the casing 63 serving as a stop for the body 10 and the bridge piece 47 in the form of a resilient arm attached to a bracket 66 to which the magnet 51 is also affixed. This apparatus is shown as enclosed in a cabinet 67 having the resistance 54 mounted along one of the longitudinal walls thereof. From Figs. 2 and 4 it will be seen that the rolling bodies 11 and 12 and their associated magnets and cooperating parts are arranged in longitudinally spaced relation within the cabinet to provide a compact, enclosed unit for indicating the condition of the brakes.

In Fig. 5 the cabinet 67 is pivotally mounted on a bracket 68 and is adapted to be affixed in various positions about its pivot by means of a wing nut 69 threaded onto the end of a pivot and against the bracket. A spirit level 71 is mounted upon the exterior of the cabinet to enable persons using the device properly to adjust the same to assure that the inclined planes will bear the correct relation to horizontal to give accurate results.

In Fig. 6 the bridge piece 47 does not engage the core of the magnet 51 directly but carries a resilient strip 72 of non-magnetic material which overlies the end of the core piece and thus avoids the effect of residual magnetism. It will be understood, however, that the core piece may be provided with a cap 72' of non-magnetic material for the same purpose as shown in Fig. 3.

In the modification shown in Fig. 7 a weight 76 is threaded upon the upper end of rod 77 which is mounted to pivot at 78, this weight being normally disposed against a stop 79 and is movable in response to the reaction produced upon the application of the brakes to engage the bridge piece 47 and thus to actuate the circuit making and breaking devices in much the same manner as this is accomplished by the rolling bodies illustrated in the previous views. This weight is adjustable along the rod and it will be understood that the weight may be so selected and positioned with respect to its pivotal mounting as to indicate the condition of the brakes in a manner similar to that previously set forth herein.

In Fig. 8 the inertia member is in the form of a cylindrical rolling body 81 supported upon an inclined plane 82 and enclosed in a casing 83 the rear wall of which functions as a stop to support the body on the plane. A leaf spring 84 projects upwardly through an opening in this plane and engages the rolling body 81. This spring is carried by a contact or bridge piece 47' which is adapted to complete the circuit to the magnet 51' as the body is caused to move upwardly along the inclined plane and thus to act through the spring 84 to depress the bridge piece.

In the apparatus shown in Fig. 9 the inertia members are also in the form of cylindrical rolling bodies within casings 86, 87 and 88 and magnets 89, 90 and 91 are arranged in opposed relation thereto with bridge pieces 92, 93 and 94 interposed therebetween in the same general arrangement as set forth specifically with reference to Fig. 2. In this modification, however, a signal device is connected in parallel with each magnet, thus the signal 96 is in parallel with magnet 89, the signal 97 is in parallel with magnet 90, while the signal 98 is in parallel with magnet 91, the apparatus being otherwise connected with a source of electrical energy 99 and controlled by a brake actuated segment switch 101 as previously described. With this form of apparatus it will be seen that when the brakes are applied, segment switch 101 will be closed and when the requisite decelerating force is produced the body 86 will move the bridge piece 92 across the upper set of contacts and complete a circuit through the signal 96 to the battery 99 and will also complete a holding circuit through magnet 89 thus holding the signal 96 until the circuit is broken at switch 101 by releasing the brakes. Should the application be more effective the rolling body 87 will be actuated to break the circuit to the bridge piece 92 and to move the bridge piece 93 across the upper set of contacts, thus actuating signal 97 and completing a holding circuit through the magnet 90. In a like manner if the brakes are in excellent condition and a full application is made, the rolling body 8 will be actuated to move the bridge piece 94 across the upper set of contacts thus breaking the circuit at this point to the magnets 89 and 90 and the bridge pieces 92 and 93 and completing a circuit through the signal 98 and also a holding circuit through the magnet 91. Thus in each instance the signal is retained until either a greater braking power is applied so as to actuate another signal or until the brakes are released and the circuit is broken at the segment switch 101. The signals 96, 97 and 98 may conveniently be lamps.

In the modification shown in Figs. 10 and 11 magnets 102, 103, and 104 are arranged to actuate movable core pieces 106, 107 and 108 which are pivotally connected respectively to arms 109, 111 and 112, each of these arms being rotatably mounted upon a shaft 113. The arm 109 is also connected to an arcuate member 114 while the arm 111 is connected to an arcuate member 116 and arm 11 carries an arcuate member 117, these parts being arranged so that movement of one will not interfere with the other and the arcuate members may lie in superposed relation. Thus the arcuate member 114 may carry an indication that the brakes are in poor condition while the arcuate member 116 may indicate that they are good and the last and outermost arcuate member 117 may then indicate that the brakes are in excellent condition. It will be understood that in using apparatus of this type the magnets 102, 103 and 104 function as the signals 96, 97 and 98 of the arrangement shown in Fig. 9, being connected in the circuits in the same manner as the signals 96 to 98, in which case the signal lamps may be omitted if only a worded signal is desired. When so connected the movable bodies associated with the magnets 89 to 91 (Fig. 9) respond as before, but in this case instead of lighting a signal lamp 96 when the brakes are in poor condition the apparatus now functions to energize solenoid 102 to cause the indicia carrying arcuate member 114 to expose the corresponding worded signal across the window 118. It will be evident that as each of solenoids 102, 103, 104, is deenergized, its core piece drops by gravity thereby removing the worded signal from the window. On further application of the brakes such as to produce the second reading the solenoid 103 is actuated to move its arcuate member 116 in the position shown in Figs. 10 and 11 and likewise if the brakes are in excellent condition the member 117 is moved across the window 118.

It wil be apparent that in the various forms shown, the signal devices or indicators are adapted to be mounted separately from other parts of the device. For instance, the meter 59, the lamps 96, 97, 98 and/or the signal apparatus of Figs. 10 and 11 may be mounted upon the dashboard or other instrument panel as, for example, in position to be in the line of vision of persons on the rear seat of an automobile, while the other portions of the apparatus may be located at any convenient point.

It should be understood that the present disclosure is for the purpose of illustration only and that this invention includes all modifications and equivalents which fall within the scope of the appended claims.

I claim:

1. Apparatus of the class described, comprising a plurality of similarly directed planes inclined at different angles to the horizontal, a cylindrical rolling body disposed on each plane, an electric circuit comprising normally open branch circuits connected in parallel, an electro-magnet in each branch circuit, a movable bridge piece for closing each branch circuit, one bridge piece being disposed across each plane at the upper end thereof and in the path of the rolling body disposed thereon, the magnets of each branch circuit being adapted to hold the bridge piece of such circuit in circuit-closing position while the magnet is energized, connections for opening other branch circuits as one branch circuit is completed by its bridge piece, and indicating means responsive to the completion of each branch circuit.

2. Apparatus of the class described, comprising a plurality of similarly directed planes inclined at different angles to the horizontal, a cylindrical rolling body disposed on each plane, an electric circuit comprising normally open branch circuits connected in parallel, an electro-magnet in each branch circuit, a movable bridge piece for closing each branch circuit, one bridge piece being disposed across each plane at the upper end thereof and in the path of the rolling body disposed thereon, the magnets of each branch circuit being adapted to hold the bridge piece of such circuit in circuit-closing position while the magnet is energized, connections for opening other branch circuits as one branch circuit is completed by its bridge piece, and a lamp connected in parallel with each magnet for indicating that the branch circuit including such lamp has been completed.

3. Apparatus of the class described, comprising a plurality of similarly disposed planes inclined at different angles to the horizontal, a cylindrical rolling body disposed on each plane, an electric circuit comprising a resistance and normally open branch circuits connected in parallel, each of said branch circuits including a different portion of said resistance, an electro-magnet in each branch circuit, a movable bridge piece for closing each branch circuit, one bridge piece being disposed across each plane at the upper end thereof and in the path of the rolling body disposed thereon, the magnet of each branch circuit being adapted to hold the bridge piece of such circuit in circuit-closing position when the magnet is energized, connections for opening other branch circuits as one branch circuit is completed by its bridge piece, and indicating means comprising a volt meter for indicating the completion of each branch circuit.

4. Apparatus of the class described, comprising a plurality of similarly directed planes inclined at different angles to the horizontal, a cylindrical rolling body disposed on each plane, means for supporting each rolling body in a given position on its plane for rolling movement upwardly from said given position, an electric circuit comprising normally open branch circuits connected in parallel, a bridge piece for closing each branch circuit, one bridge piece being disposed across each plane at the upper end thereof and in the path of the rolling body disposed thereon, connections for opening other branch circuits as one branch circuit is completed by its bridge piece, indicating means responsive to the completion of each branch circuit, each of said rolling bodies being of relatively large diameter and having a radius greater than its distance of travel on its plane.

WILLIAM B. McGORUM.